United States Patent [19]
Lohrum et al.

[11] 4,164,102
[45] Aug. 14, 1979

[54] PROCESS FOR THE MANUFACTURE OF A CERAMIC AXIAL TURBINE WHEEL

[75] Inventors: Walter Lohrum, Aichwald; Eberhard Tiefenbacher, Ludwigsburg, both of Fed. Rep. of Germany

[73] Assignee: Daimler-Benz Aktiengesellschaft, Fed. Rep. of Germany

[21] Appl. No.: 762,520

[22] Filed: Jan. 26, 1977

[30] Foreign Application Priority Data

Jan. 29, 1976 [DE] Fed. Rep. of Germany ....... 2603226
Jun. 18, 1976 [DE] Fed. Rep. of Germany ....... 2627309

[51] Int. Cl.$^2$ ............................................. B24B 1/00
[52] U.S. Cl. ........................... 51/283 R; 29/156.8 B; 51/59 SS; 219/69 V; 416/241 B
[58] Field of Search .................. 29/156.8 B, 23.5; 51/59 SS, 157, 151, 281 R, 283 R; 219/69 V; 416/241 B, 244 A

[56] References Cited

U.S. PATENT DOCUMENTS

| 353,551 | 5/1943 | Schutte | 416/241 B |
|---|---|---|---|
| 1,568,746 | 1/1926 | Lawaczeck | 29/23.5 |
| 2,429,324 | 10/1947 | Meisser | 29/23.5 |
| 2,461,948 | 2/1949 | Whitehead | 51/157 |
| 2,633,776 | 4/1953 | Schenk | 29/23.5 |
| 2,729,422 | 1/1956 | Scharf | 29/156.8 B |
| 2,767,460 | 10/1956 | Schultz | 29/156.8 B |
| 3,091,060 | 5/1963 | Giegerich | 51/59 SS |
| 3,863,399 | 2/1975 | Cowdrick | 51/157 |
| 3,897,171 | 7/1975 | Stahl | 416/241 B |

Primary Examiner—Harold D. Whitehead
Attorney, Agent, or Firm—Craig and Antonelli

[57] ABSTRACT

A method and apparatus for manufacturing a twisted ceramic turbine wheel from an electrically conductive or electrically non-conductive ceramic mass with the aid of spark erosion or of ultrasonic machining and with the aid of profiling tools used therewith which are correspondingly matched to the desired profile shape, by means of which the pressure side and the suction side are to be worked; the two profile surfaces, i.e., the pressure side and the suction side of the profile are either worked successively by means of different tools or the pressure side and the oppositely disposed suction side are machined simultaneously by means of a single tool; in the former case, the tool is at first moved past one of the profile surfaces composed of inclined straight lines and is pivoted thereby corresponding to the inclination of the generating straight lines and thereafter is moved past the other of the two profile surfaces and is again pivoted thereby corresponding to the produced generating straight lines; in the latter case, the tool is matched to the desired profile shape on the two sides to be machined and is introduced radially to the turbine wheel into the hollow space to be machined between two respective profile blade surfaces to be machined, whereby the work tool carries out the necessary oscillations for the spark erosion or the ultrasonic working.

13 Claims, 9 Drawing Figures

PROCESS FOR THE MANUFACTURE OF A CERAMIC AXIAL TURBINE WHEEL

The present invention relates to a method for the manufacture of a ceramic axial turbine wheel from an electrically conductive or electrically non-conductive ceramic mass with the aid of spark erosion or supersonic machining and with the aid of cylindrical work tools used in connection therewith and matched correspondingly to the desired profile blade shape.

The efficiency of gas turbines can be increased by an increase of the fresh gas temperature. However, only ceramic axial turbine wheels are still able to withstand such a temperature increase which, however, by reason of their great hardness can be manufactured only with very great difficulties. It has already been attempted to machine such ceramic axial turbine wheels with the aid of supersonic boring techniques or, in case of electrically conductive ceramics, with the aid of spark erosion, However, significant efficiency increases could still not be attained with this type of manufacture because it was only possible with the aid of the aforementioned techniques, to manufacture rectilinear, i.e., not twisted, cylindrical blades. With these rectilinear cylindrical blades, which were machined out of the solid blank of a ceramic turbine wheel body, the head profile and base profile are congruent as viewed in the radial direction on the respective turbine blades. For reasons of strength and rigidity and in order to attain a reasonable efficiency of the turbine that is acceptable at least to some degree, it is desirable to manufacture a wheel with twisted conical blades. However, such a conical twisted blade could not be manufactured heretofore with the aid of the heretofore-known method of the ultrasonic working or of the spark erosion.

It is the aim of the present invention to enable the manufacture of such twisted blade profiles notwithstanding the heretofore known difficulties also by the use of ultrasonic boring techniques or with the aid of spark erosion.

The underlying problems are solved according to the present invention in that the two profile surfaces, i.e., the pressure side and the suction side of the profile, are machined successively by means of a cylindrical shaping or profiling tool which has a larger machining cross section than corresponds to the final intended profile cross section at each cross-sectional place of the respective blades and which initially is moved past the one profile surface composed of inclined straight lines as well as is pivoted thereby corresponding to the inclination of the generating straight lines and then is moved past the other profile surface also composed of inclined straight lines and is thereby pivoted corresponding to the inclination of the generating straight lines, whereby the larger width of the profiling tool which is larger compared to the final profile, results from the magnitude of the pivoting action. Of course, it may under certain circumstances be still more simple to pivot thereby the workpiece in lieu of the work tool.

After the profile surfaces, namely the pressure surface and the suction surface are worked or machined, parts of the ceramic body still remain at the two edges of the vane or blade profile, whose contour does not correspond to the intended, rounded-off configuration, properly speaking, of the blade or vane edge. Since, however, the ceramic blades now have very slight dimensions of the order of magnitude of 1 to 2 cm., these profile edges can be readily re-machined afterwards. According to a further feature of the present invention, the profile vane or blade edges, after the forming of the profile surfaces, can be machined with different tools by means of an ultrasonic apparatus or by means of a spark erosion apparatus or also mechanically by hand. A shaping or profiling tool can also be used for that purpose.

With the larger number of the blades of a wheel or with the manufacture of several wheels, it is appropriate within the purview of the present invention to first work or machine the one profile surfaces, for example, the pressure surfaces and then only the other profile surfaces, for example, the suction surfaces of all of the blades.

In order that the inclination of the profile blade edges can now be maintained accurately during the working or machining and all turbine blades are worked or machined uniformly, it is appropriate according to a still further feature of the present invention to provide an apparatus therefor which is so constructed that it carries out automatically the desired movements of the mounted turbine wheel in adaptation to the feed of the work tool.

Additionally, it has been discovered that turbine wheels cannot only be made according to the methods described so far hereinabove but can also be manufactured according to a slightly modified method by working or machining the blades by means of spark erosion or ultrasonics. This modified method according to the present invention is characterized in that respectively a pressure side and the suction side disposed opposite thereto are machined or worked simultaneously by means of a single tool which is matched to the desired profile shape on the two machining sides and is introduced or fed radially with respect to the turbine wheel into the hollow space to be machined between respectively two profile blade surfaces to be machined, whereby the work tool carries out the oscillations necessary for the spark erosion or ultrasonic treatment.

According to a further feature of the present invention, the profiling tool may be rotated during its radial introduction and while it carries out the machining oscillations.

As to the rest, the method according to the present invention can be carried out by means of a work tool which is adapted to be mounted at the ultrasonic apparatus or at the spark erosion apparatus and is constructed in its working area approximately wedge-shaped as well as in such a manner that it fits into the intermediate space which remains between two adjacent blades of a finished turbine wheel, and that its working surfaces are matched to the respectively oppositely disposed surfaces of adjacent blades whereas, as to the rest, it includes a hilt or haft adapted to be inserted into the work tool holder of the ultrasonic or spark erosion apparatus.

Accordingly, it is an object of the present invention to provide a method for manufacturing a ceramic axial turbine wheel which eliminates by simple means the aforementioned shortcomings and drawbacks encountered in the prior art.

Another object of the present invention resides in a method for the manufacture of ceramic axial turbine wheels which not only greatly facilitates their manufacture with the aid of spark erosion or ultrasonic apparatus but increases the operating efficiency of the finished turbine.

A further object of the present invention resides in a method of the type described above which permits the manufacture of twisted ceramic blades, especially twisted conical blades.

Still a further object of the present invention resides in a method for the manufacture of ceramic axial turbine wheels which greatly simplifies the manufacturing operations, yet eliminates the limitations, heretofore imposed by the prior art methods, as regards the shapes of the blades.

These and further objects, features and advantages of the present invention will become more apparent from the following description when taken in connection with the accompanying drawing which shows, for purposes of illustration only, two embodiments in accordance with the present invention, and wherein.

Figure 1:
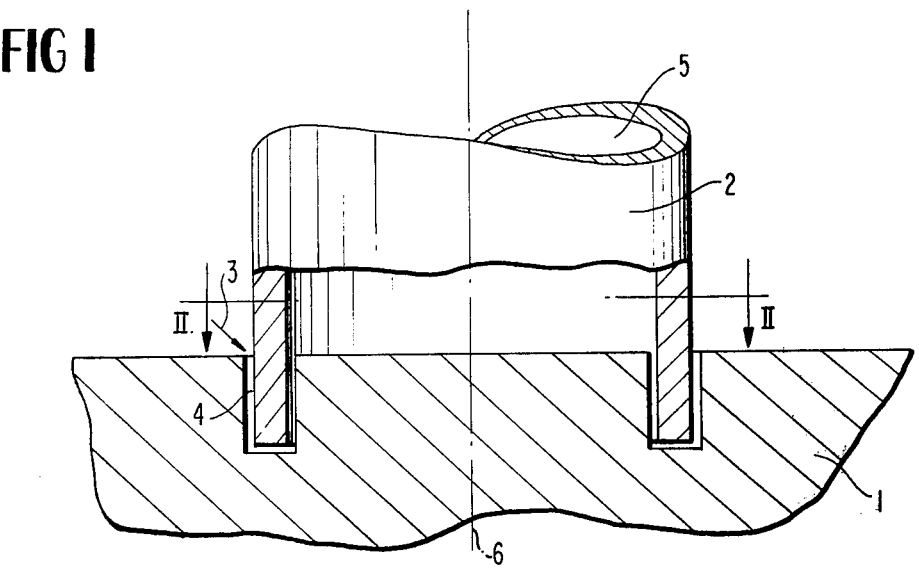
FIG. 1 is a cross-sectional view through a workpiece with a work tool of an ultrasonic borer in accordance with the present invention which has already partly penetrated into the workpiece.
Figure 2:
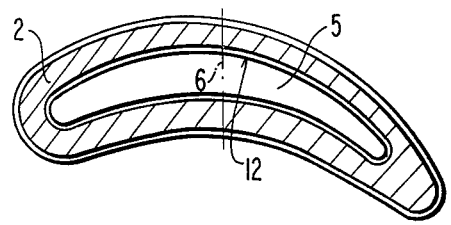
FIG. 2 is a cross-sectional view through the work tool according to line II—II of FIG. 1.
Figure 3:
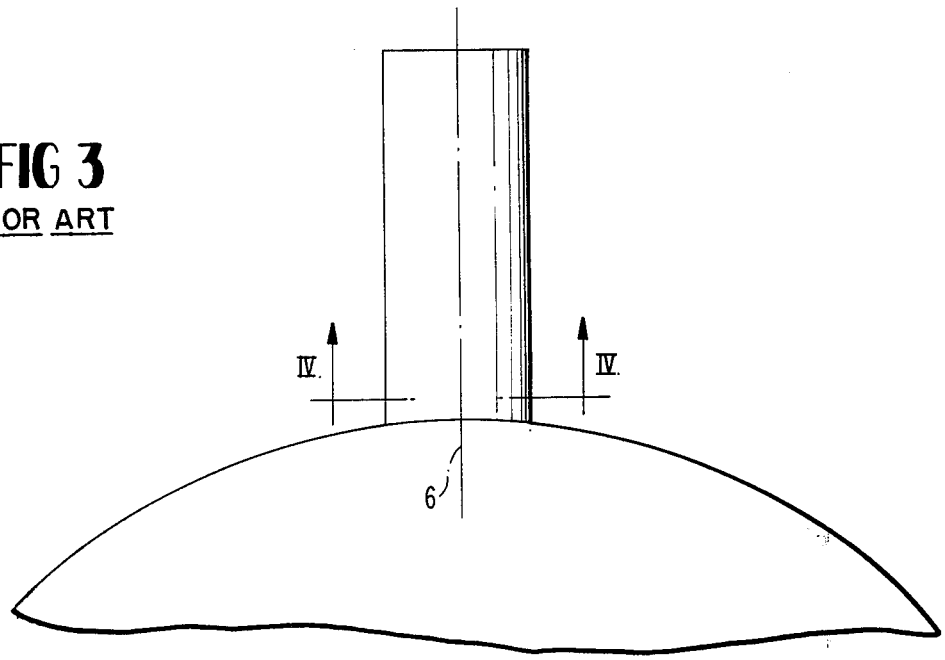
FIG. 3 is a side elevational view of a prior art turbine blade seated on a turbine wheel hub.
Figure 4:
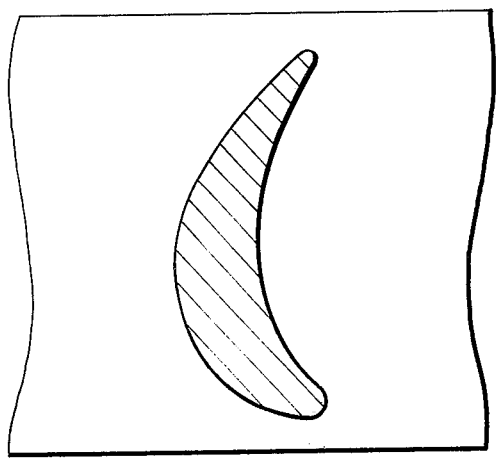
FIG. 4 is a cross-sectional view through the turbine wheel taken along line IV—IV of FIG. 3.
Figure 5:
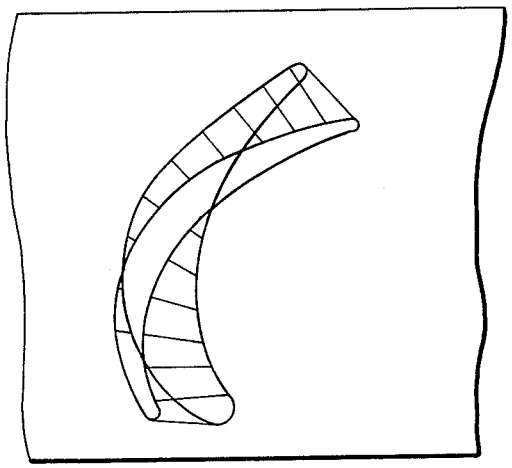
FIG. 5 is an attempted schematic illustration of a turbine blade in accordance with the present invention whose twisted profile surfaces are formed by straight lines disposed adjacent one another.
Figure 6:
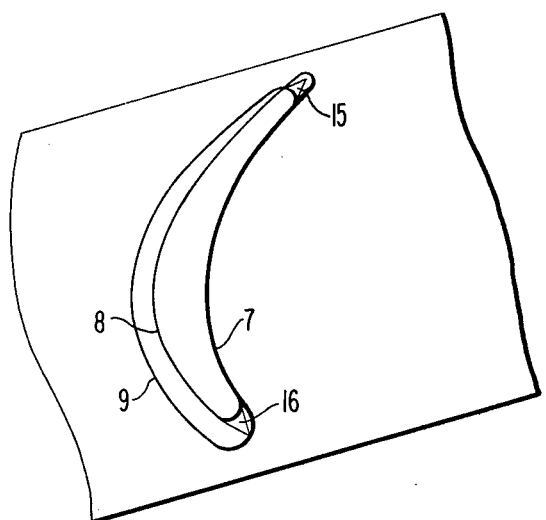
FIG. 6 is a plan view illustrating the congruence of the head and base cross section of the pressure side profile surface in accordance with the present invention.
Figure 7:
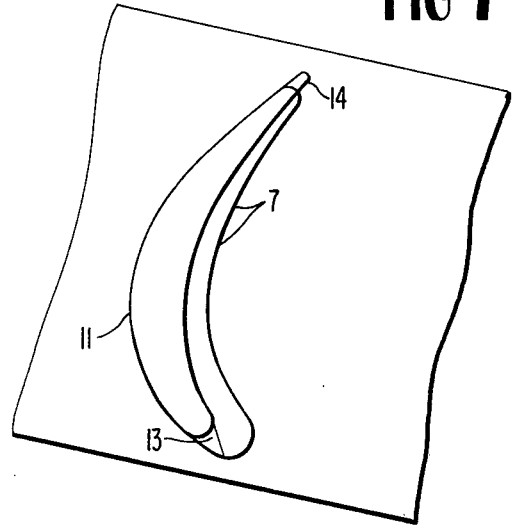
FIG. 7 is a plan view illustrating the congruence of the head and base cross section of the suction side profile surface of a turbine blade in accordance with the present invention.
Figure 8:
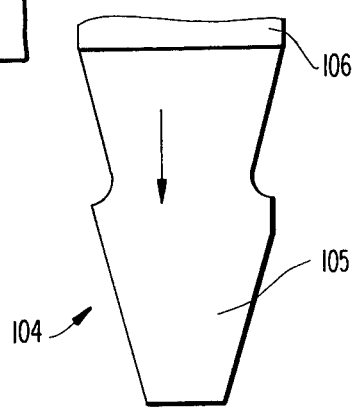
FIG. 8 is a somewhat schematic elevational view of a modified embodiment of an erosion machining tool in accordance with the present invention for manufacturing an axial turbine blade.

Referring now to the drawing wherein like reference numerals are used throughout the various views to designate like parts, ultrasonic boring techniques can be used with electrically non-conductive, brittle-hard materials. However, this method is not applicable to ductile-hard materials. Brittle-hard materials are glass, ceramics, precious stones, silicone, germanium, carbon, graphite, ferrites and in some cases also hard metals. Since turbine wheels, as indicated above, can be manufactured from ceramic materials with high heat resistance, the ultrasonic working or machining techniques are the correct method in order to manufacture turbine blades in the manner according to the present invention also with twisted profile surfaces. A side elevational view and partially a cross section through the workpiece with the work tool already partly penetrated into the same of an ultrasonic machining apparatus of otherwise conventional construction is illustrated in FIG. 1 which operates vertically with about 22 kHz in a conventional manner. The workpiece 1 is gradually hollowed-out by the work tool 2 within the area of the cross-sectional profile of the work tool 2 illustrated in FIG. 2 as a result of the applied high oscillations. The cylindrical boring tool 2 therefore does not rotate but oscillates accurately in the feed direction. It therefore also need not be round but instead has the profile of the bore to be produced. The removal of the material within the area of this profile takes place by a large number of small granules of a grinding- or abrasive-material suspension which penetrate in the direction of the arrow 3 (FIG. 1) through the narrow gap 4 and are again sucked-off through the hollowed-out portion 5 (FIG. 2) disposed in the center together with the grinding material, by means of which also the chipped material is carried off. Heretofore it was possible by guiding the work tool 2 and of the workpiece 1 against one another in the direction of the axis 6 to separate out only cylindrical profiles for the axial turbine wheels out of an unfinished blank. The result of such an ultrasonic machining is illustrated in FIGS. 3 and 4. Such turbine wheels, however, have a very small and non-satisfactory efficiency. Consequently, serious efforts were made to find a solution to the problem of how twisted blades could also be manufactured by means of ultrasonic machining techniques. The present invention is predicated on the fact that this is possible if blades which are twisted as shown in FIG. 5 are manufactured whose profile surfaces may be considered as having come into existence from parallel straight lines. This is so as with such twisted blades according to FIG. 5, parallel straight lines can be drawn through from the head profile to the base profile which, placed adjacent one another, produce the twisted profile. For purposes of manufacture of such a blade, at first one side, for example, the pressure side 7 is made according to FIG. 6, and then only the suction side 11 of the profile is made according to FIG. 7. This takes place in such a manner that at first attention will be paid only to the machining of the pressure side. The ultrasonic machining apparatus thereby remains stationary and the workpiece together with the blade profile resulting thereon is so pivoted that with the further advance of the ultrasonic tool the respectively machined cross-sectional edge of the pressure side 7 is located always at the same place as the previously already machined, higher cross-sectional edges of the pressure side. This is achieved by conventional means, not described in detail herein since they form no part of the present invention. No attention whatsoever is thereby paid as to what type of profile results on the suction side. This is so as a profile results on the suction side which in most places is larger than that which is ultimately required on this side. This is reproduced in FIG. 6 by the two lines 8 and 9 which, in contrast to the profile lines 7 in FIG. 6 are not congruent. When the profile surface 7 of the pressure surface has been completely machined, the tool is removed and the corresponding pressure surface of the adjacent blades is machined in the same manner, for which purpose a mechanism of conventional construction is used which automatically undertakes the necessary pivoting of the workpiece and therewith its adaptation to the respectively necessary machining or working position. Again, since such mechanisms utilize conventional means, a detailed description thereof is not disposed for the sake of simplicity. If all of the profile surfaces 7 of the blades have been machined, then the turbine wheel is positioned and adjusted anew and is mounted on the pivotal apparatus (not shown) in such a manner that now the profile lines of the suction side 11 become also congruent in this case as they pass the working or machining surface 12 of the tool. By reason of the fact that a pivoting of the workpiece was undertaken as a result of the machining, the resulting profile has been machined with a sufficiently large clear gap about the profile so that the ultrasonic apparatus no longer removes anything on the already machined pressure side from the pressure surface disposed thereat which has already been finish-machined.

If the blade profiles are machined in this manner, then the residual portions 13 to 16 still remain at the respective deflection edges of the profiles. The same can be removed by means of a further ultrasonic manual apparatus, which involves no great difficulty since the blade profiles only have a very slight dimension of about 1 to 2 cm. and the parts to be removed are only very small as regards volume.

An ultrasonic machine with several ultrasonic heads of conventional construction may also be used for an economic series-manufacture so that correspondingly several profiles can be manufactured simultaneously.

Ceramic blades can be manufactured in a similar manner by spark erosion if the blank consists of an electrically conductive ceramic mass.

Figure 9:
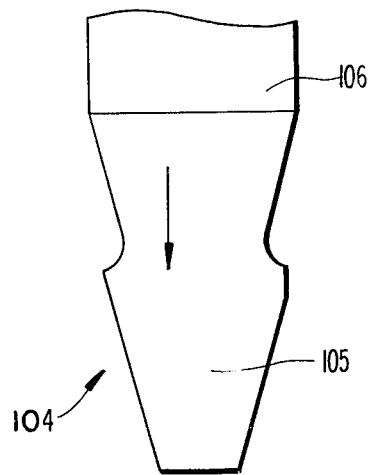
FIG. 9 is a somewhat schematic elevational view illustrative of a modified method in accordance with the present invention utilizing the tool of FIG. 8.
Figure 9:
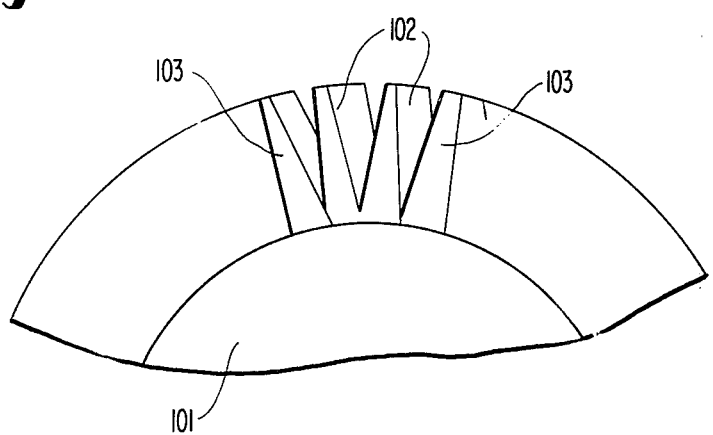

FIG. 9 illustrates a partially machined turbine wheel 101 which is being manufactured according to a modified method of the present invention. As a result of previous working or machining, two turbine blades 102 have already been manufactured completely and two turbine blades 103 have already been manufactured partly. The turbine blades are worked or machined by means of the work tool generally designated by reference numeral 104 which includes wedge-shaped working areas 105, by means of which it is introduced into the intermediate spaces remaining between two turbine blades. As to the rest, the work tool 104 includes a hilt or handle 106 by means of which it is inserted into the work tool holder of the ultrasonic and spark erosion apparatus.

For purposes of machining the turbine wheel, the wedge-shaped working area 105 and the turbine wheel are moved toward one another (as represented by the arrow on tool 104), whereby with a turned-on ultrasonic or spark erosion apparatus, the intermediate space between two turbine blades is being machined out in each case (it is noted that tool 104 is exaggerated in size relative to turbine wheel 101 in FIG. 9 and in acutality, working area 105 is smaller than the resultant gap between the finished blades). After the manufacture of an intermediate space between two blades, the turbine wheel is further rotated through one pitch and then the work piece is introduced again for machining out the next intermediate space, until successively all turbine blades have been manufactured.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for the manufacture of a twisted blade ceramic turbine wheel having a hub and a plurality of blades by erosion of a single ceramic mass with the aid of profiling tool means matched to the desired profile shape, comprising the steps of eroding the pressure and suction profile surfaces on the blade profile successively by tool means including the steps of aligning the tool means with respect to the ceramic mass so as to be in alignment with straight lines defining one of pressure and suction profile surfaces of a blade to be formed, moving a respective tool means initially along inclined straight lines with an orientation between the workpiece and the tool means corresponding to an inclination required to generate a desired first of said profile surfaces, realigning said tool means with respect to said ceramic mass so as to be in alignment with straight lines defining the other of said profile surfaces, and thereafter moving a respective tool means along other inclined straight lines with an orientation between the workpiece and the tool means corresponding to an inclination required to generate the other of the desired profile surfaces.

2. A method according to claim 1, characterized in that the two profile surfaces are machined by different profiling tool means.

3. A method according to claim 1, characterized in that the two profile surfaces are machined by a single profiling tool means.

4. A method according to claim 1, characterized in that the profile blade deflecting edges are finished after the machining out of the profile surfaces.

5. A method according to claim 4, characterized in that the profile blade deflecting edges are finished by ultrasonic techniques.

6. A method according to claim 4, characterized in that the profile blade deflecting edges are finished manually mechanically.

7. A method according to claim 1, characterized in that at first the first profile surfaces and thereafter the second profile surfaces of all blades are machined.

8. A method according to claim 7, characterized in that the first surfaces are the pressure surfaces and the second surfaces the suction surfaces.

9. A method according to claim 1, characterized in that the two profile surfaces consist of pressure and suction sides of the profile blade and are machined successively by means of a single tool means which has a larger machining cross section than corresponds to the finally intended profile cross section.

10. A method according to claim 1, wherein said erosion machining is performed by the spark erosion of an electrically conductive ceramic mass.

11. A method according to claim 1, wherein said erosion machining is performed by the ultrasonic erosion machining of an electrically non-conductive ceramic mass.

12. A method according to claim 1, wherein the step of moving a tool means along a straight line is preceded by the step of orienting the ceramic mass so that points at the head of the blade to be formed on the side to be machined are oriented directly in overlapping alignment with the points at the base of the blade to be formed.

13. A twisted turbine wheel produced by the method of claim 1.

* * * * *